United States Patent [19]

Cipriano

[11] Patent Number: 4,734,181
[45] Date of Patent: Mar. 29, 1988

[54] ELECTROCHEMICAL CELL

[75] Inventor: Robert A. Cipriano, Lake Jackson, Tex.

[73] Assignee: The Dow Chemical Company, Midland, Mich.

[21] Appl. No.: 697,505

[22] Filed: Dec. 7, 1984

[51] Int. Cl.⁴ .......................... C25B 9/00; C25B 15/08
[52] U.S. Cl. ...................................... 204/257; 204/263
[58] Field of Search ............................... 204/253–258, 204/263, 182.4, 182.5, 151, 301, 264–266

[56] References Cited

U.S. PATENT DOCUMENTS

| | | | |
|---|---|---|---|
| 1,878,237 | 9/1932 | Hoffman et al. | 204/255 X |
| 2,784,158 | 3/1957 | Bodamer et al. | 204/151 X |
| 3,775,283 | 11/1973 | Eisele et al. | 204/255 X |
| 4,095,519 | 9/1977 | Sloan | 204/301 X |
| 4,124,477 | 11/1978 | Tokawa et al. | 204/252 |
| 4,384,937 | 5/1983 | Shuster et al. | 204/257 X |
| 4,394,246 | 7/1983 | Richman et al. | 204/301 |
| 4,443,316 | 4/1984 | Struck | 204/263 |
| 4,569,747 | 2/1986 | Kedem et al. | 204/257 X |
| 4,632,745 | 12/1986 | Giuffrida et al. | 204/182.5 |

FOREIGN PATENT DOCUMENTS 1268182   3/1972   United Kingdom ................ 204/255

Primary Examiner—Donald R. Valentine

[57] ABSTRACT

In accordance with the present invention an electrochemical cell unit is comprised of:

an anolyte compartment, catholyte compartment separated from each other by a pair of close spaced ionic (cationic/or anionic) membranes which together with a foraminous non-structural spacer therebetween form an intermediate compartment between the anolyte and catholyte compartments, respectively, which upon application of hydraulic pressure to the anolyte and/or the catholyte compartments reduce the cross membrane distance of the intermediate compartment to a minimum distance.

7 Claims, 1 Drawing Figure

ELECTROCHEMICAL CELL

BRIEF DESCRIPTION OF THE INVENTION

In accordance with the present invention an electrochemical cell unit is comprised of:

an anolyte compartment and a catholyte compartment separated from each other by a pair of close spaced ionic (cationic or anionic) membranes which together with a foraminous non-structural spacer therebetween form an intermediate compartment between the anolyte and catholyte compartments, respectively, which upon application of hydraulic pressure to the anolyte and/or the catholyte compartments reduces the cross membrane distance of the intermediate compartment to a minimum distance.

Further in accordance with the present invention an apparatus is described for carrying out an electrochemical reaction which comprises a first frame-like member having an anode within its central portion, two opposite sides of said frame-like member including means to introduce and withdraw a fluid from said frame interior, a second frame-like member having a cathode within its central portion, two opposite sides of said frame-like member including means to introduce and withdraw a fluid from said frame interior,

- a third frame-like member matingly abuttingly sealable to and between each of said aforedescribed first and second frame like members, said third frame-like member having a foraminous material within its central portion and a pair of cationic membranes on each side of said foraminous material defining with said frame a central compartment whose minimal thickness is that of the foraminous material,
- said foraminous material being of a non-structural nature capable of sustaining repeated flexure within said frame and compression between said membranes,
- said frame having in opposite frame members means to introduce and withdraw, respectively, a fluid, from said so defined compartment;
- said frames abuttingly and sealably aligned in alternating sequence to provide at least one combination of an anode containing frame abutting a frame including the pair of membranes which sealably abuts a cathode containing frame,
- each combination or series of combinations being associated with a plate abuttingly sealable with each last frame of said combination, therewith to form a fluidtight body into which and from which three distinct fluids may be fed, acted upon within the respective compartments and withdrawn therefrom,
- means to introduce into each chamber defined by said frames and membranes a different fluid to be acted upon within its respective chamber, said means being interior of said frames and being capable of applying to each of said fluids a pressure independent of the other fluids and,
- means exterior of said frames to provide electrical power to the anode and cathode of said frames.

One embodiment of a cell which employs this concept is comprised of:

(1) a substantially rectangular frame having an anode suspended within the central portion of the frame, electrical contacts connecting said anode to a power source, said anode suspended preferably by the electrical contacts for the anode and inlet and outlet means to the frame interior;

(2) an intermediate chamber assembly which abuts said anode frame comprised of a pair of ionic membranes separated from each other by a porous or foraminous spacer provided with inlet and outlet means; and, (3) a substantially mating rectangular frame which abuts the intermediate chamber assembly and which frame has a cathode suspended within the frame, electrical contacts connecting said cathode to a power source, said cathode suspended preferably by the electrical connectors for the cathode and inlet and outlet means to said frame interior.

The inlet and outlet means to each compartment enable liquid anolyte, reaction product and catholyte, respectively, to be fed to and removed from the chambers defined by the membranes.

The concept of the present invention enables the intermediate compartment to achieve a desired thickness or width between the membranes, usually the minimum thickness of the spacer thereby providing an environment for minimum voltage and current to accomplish a high efficiency, measured of course by the volt-ampere-productivity conversion parameters.

It is to be understood that various materials and form and shapes of materials can be employed to obtain the desired intermediate compartment spacing. Thus, for example, a non-woven polypropylene or fluorocarbon scrim of fibers or filaments laid one thickness at right angles or askew to the other is particularly suitable both from the basis of minimum thickness and maximum channels for passage of the fluid in the compartment. The introduction of surface malfunctions to the scrim element filaments can aid in the mixing and turbulence of the fluid in the compartment. Since electrochemical processes are highly transport dependent, replenishment of the necessary ions for transport to the membrane surface is of fundamental importance. Depletion of said ions leads to loss of efficiency due to polarization, increased resistance, heat build-up and other undesirable developments. Due to the design of the center compartment in the present invention, advantage can be made of the form of the said spacer used, to benefit the overall efficiency of a process using the invention. In accordance with this invention membranes which have the ability to flex are beneficially used. Since during the use of the invention some flexing and or bending is required of the ionic membranes. To achieve maximum utility of the invention those membranes which have the ability to blend or flex without stretching, cracking, crazing, rupturing or the like have greatest utility. It is known that many commercially available styrene divinyl benzene based membranes readily crack when flexed. Grafted polypropylene membranes are now resistant to cracking but may tear when repeated flexing is occasional. Fluorocarbon membranes have been found to be most resistant to the aforementioned failures. The inertness and flexural strength of the fluoropolymers greatly aids in satisfying the requirements of the present invention. The spacing of the scrim element filaments should be such that under the maximum pressure exerted by the anolyte and catholyte the membranes will at most only minimally touch each other. It is to be further understood that should flow be restricted by the compression of the membranes toward each other to achieve maximum power efficiency and conversion, the pressure may be pulsed to allow flow of intermediate chamber fluids from inlet to outlet, alternating with the advantageous spacing for efficiency of operation.

BRIEF DESCRIPTION OF THE DRAWING

The drawing illustrates an expanded isometric view, one embodiment of the present invention.

DETAILED DESCRIPTION OF THE DRAWING

Figure 1:
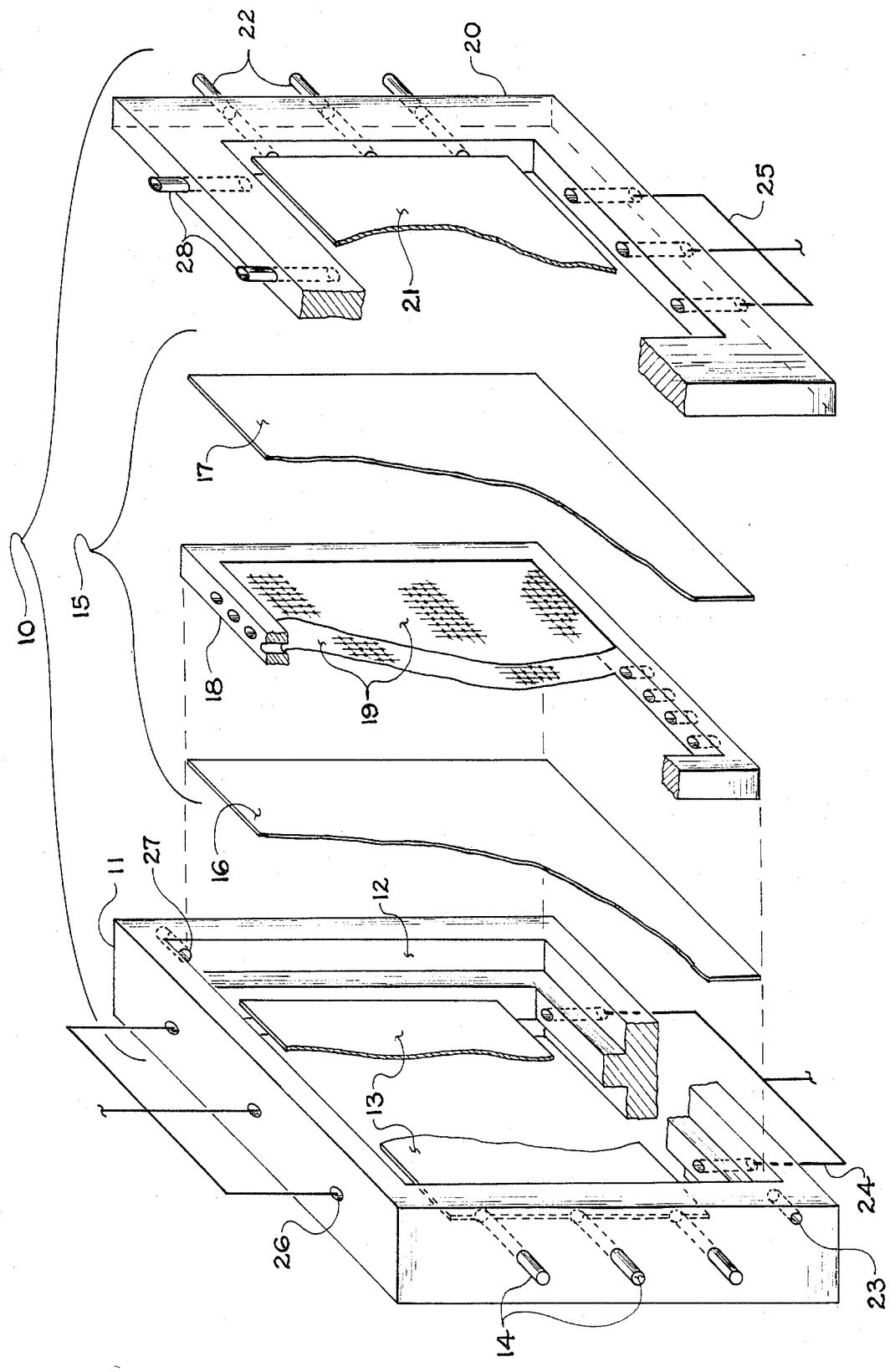

In accordance with the present invention with particular reference to the drawing one embodiment of an electrochemical cell unit 10 falling within the concept may be comprised of:

(1) a substantially rectangular frame 11 having a shoulder 12 about the inner periphery of the frame and an anode 13 suspended within the central portion of the frame, electrical connectors 14 connecting said anode to a power source, said anode suspended preferably by the electrical contacts for the anode;

(2) an intermediate chamber assembly 15 which fits on said shoulder 12 of said anode frame 11 comprised of a pair of ionic membranes 16 and 17 separated from each other by a frame 18 and within the frame a porous or foraminous spacer 19; and, (3) a substantially rectangular frame 20 which abuts the anode frame 11 and the intermediate chamber assembly 15 and which frame has a cathode 21 suspended within the frame 20, electrical connectors 22 connecting said cathode to a power source, said cathode suspended preferably by the electrical connectors for the cathode.

Each frame has inlets 23, 24 and 25 and outlets 26, 27 and 28 to enable liquid anolyte, reaction, product and catholyte, respectively, to be fed to and removed from the chambers defined by the membranes.

The Anode Frame

The anode frame in the aforedescribed embodiment is a generally rectangular member having a shoulder within the frame to receive the intermediate chamber assembly. If more than one cell unit is to be joined together to make a multi-cell unit, each side of the anode frame has a shoulder and an intermediate chamber assembly is inserted into each shoulder, a single anode thus serves for two adjoining cells. The frame has an inlet and an outlet for anolyte drilled through the upper and lower frame members, respectively, in substantially centered relationship with respect to the width of the frame at one side or the other of the horizontal frame members. The holes may be drilled from either side and preferably are such that the inlet is on one side of the cell and the outlet is on the other side of the cell. In addition, a horizontal hole is drilled in each of the upper and lower frame members central to one shoulder area to serve as reactant inlet, lower frame member, and product outlet, upper frame member and series of small holes is drilled into each of the horizontal upper and lower frame members in a manner to connect the horizontal inlet and outlet holes to the interior of the frame in the vicinity of the intermediate chamber assembly. When more than one cell unit is to be combined the horizontal frame members above each shoulder are so drilled.

The frame has means to suspend a flat anode within the central portion between the shoulder or shoulders. Also the frame has means, usually the suspending means, to connect the anode with a source of electrical current.

The frame material can be any material which has the strength and integrity to support the anode and intermediate chamber assembly and retain the liquids necessary to operate the cell.

The Intermediate Chamber Assembly

The intermediate chamber assembly consists of a generally rectangular member of a size to fit within the shoulder zone of the anode frame. Positioned on each side of the rectangular member is an ionic membrane which is of a size to permit all four edges to be pressed between the rectangular member and the inner surface of the anode frame shoulder on one side and the cathode frame on the other. A highly foraminous spacer material, for example, non-woven polyethylene or polypropylene scrim, is preferably inserted within the frame between the two membranes. The rectangular member has a series of holes drilled through each horizontal element which mate with the similar series of holes in the upper and lower shoulder portions of the anode frame, thus providing an inlet and outlet for the reactant and product, respectively, into and out of the intermediate chamber.

The material of construction of the rectangular member is, as is the anode frame, any material having the strength and integrity to maintain a liquid within its interior.

The Cathode Frame

The cathode frame is substantially rectangular in shape and has suspended substantially centrally a cathode plate. The cathode frame externally is substantially the same size as the anode frame and internally of a size to matingly provide a surface to press against the intermediate chamber assembly about the said chamber's rectangular member. The cathode frame has an inlet and outlet drilled through the lower and upper frame members, respectively, for catholyte liquid. Similar to the anode frame, there are provisions for suspending the cathode and making electrical connections through the frame side wall.

The material of construction of the frame is of the same general nature as the anode frame.

What is claimed is:

1. An apparatus for carrying out an electrochemical reaction which comprises a first frame like member having an anode within its central portion, two opposite sides of said frame like member including means to introduce and withdraw a fluid from said frame interior, a second frame like member having a cathode within its central portion, two opposite sides of said frame like member including means to introduce and withdraw a fluid from said frame interior, a third frame like member matingly abuttingly sealable to and between each of said aforedescribed first and second frame like members, said third frame like member having a foraminous material within its central portion and a pair of cationic membranes on each side of said foraminous material defining with said frame a central compartment whose minimal thickness is that of the foraminous material, said foraminous material being of a non-structural nature capable of sustaining repeated flexure within said frame and compression between said membranes, each said frame having in opposite frame members mean to introduce and withdraw, respectively, a fluid, from said so defined compartment;

said frames abuttingly and sealably aligned in alternating sequence to provide at least one combination of an anode containing frame abutting a frame including the pair of membranes which sealably abuts a cathode containing frame, each combination or series of combinations being associated with a plate abuttingly sealable with each last frame of said combination, therewith to form a fluid tight body into which and from which three distinct fluids may be fed, acted upon within the respective compartments and withdrawn therefrom, means to introduce into each chamber defined by said frames and membranes a different fluid to be acted upon within its respective chamber, said means being interior of said frames and being capable of applying to each said fluids a pressure independent of the others fluids, means exterior of said frames to provide electrical power to the anode and cathode of said frames.

2. In the apparatus of claim 1 wherein said membranes are capable of maintaining their structural integrity while flexing.

3. In the apparatus of claim 2 wherein said membranes are fluorocarbon or hydrocarbon based polymers.

4. In the apparatus of claim 1 wherein the distance between the membranes can be varied by varying the foraminous material thickness.

5. In the apparatus of claim 1 wherein th flow pattern of a fluid introduced into the compartment formed can be altered by choice of foraminous material.

6. In the apparatus of claim 1 wherein the distance across the compartment formed by the membranes can be changed by deliberately pulsing of pressure to free said compartment of fouling agents.

7. An electrolytic cell system utilizing the apparatus of claim 1 wherein the anode compartment contains an electrolyte, the cathode compartment contains an electrolyte, and the intermediate compartment contains a spacer of foraminous material and an aqueous solution of an ionizable compound which is electrochemically converted therein.

* * * * *

UNITED STATES PATENT AND TRADEMARK OFFICE
CERTIFICATE OF CORRECTION

PATENT NO. : 4,734,181
DATED : March 29, 1988
INVENTOR(S) : Robert A. Cipriano

It is certified that error appears in the above-identified patent and that said Letters Patent is hereby corrected as shown below:

On the title page
The Appl. No.: "697,505", should read --679,505--.

Under "References Cited", line 7, the U.S. Patent number "4,095,519" should read --4,049,519--.

Column 1, line 30, "frame like" should read --frame-like--.

Column 2, line 59, "occasional" should read --occasioned--.

Column 3, line 36, "reaction," should read --reaction-- (no comma).

Signed and Sealed this

Twenty-sixth Day of September, 1989

Attest:

DONALD J. QUIGG

*Attesting Officer*  *Commissioner of Patents and Trademarks*